No. 893,038. PATENTED JULY 14, 1908.
O. VADAM.
AIR PUMP FOR INFLATING PNEUMATIC TIRES.
APPLICATION FILED JAN. 15, 1907.
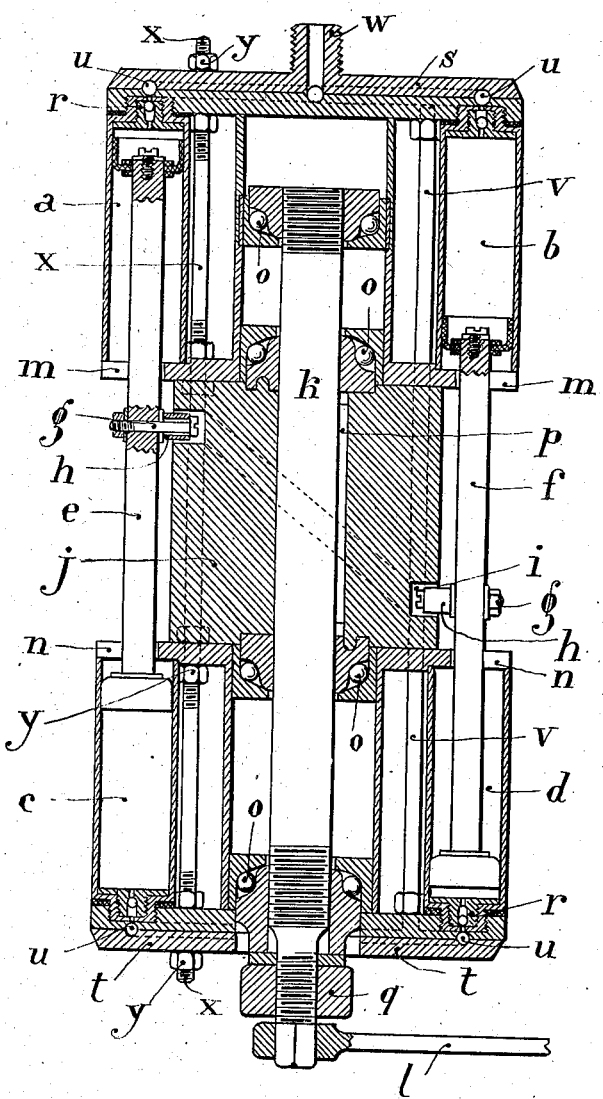

UNITED STATES PATENT OFFICE.

OCTAVE VADAM, OF PARIS, FRANCE.

AIR-PUMP FOR INFLATING PNEUMATIC TIRES.

No. 893,038.   Specification of Letters Patent.   Patented July 14, 1908.

Application filed January 15, 1907. Serial No. 352,414.

*To all whom it may concern:*

Be it known that I, OCTAVE VADAM, a citizen of the French Republic, and resident of Paris, France, have invented certain new and useful Improvements in Air-Pumps for Inflating Pneumatic Tires, of which the following is a specification.

This invention relates to an air-pump with alternating rectilinear motion which is composed of a variable number of cylinders arranged according to the generating lines of one cylinder, the piston rods being connected with a helicoidal cam keyed upon a shaft placed in the axis of said cylinder.

According to this invention a very great number of small cylinders, twenty for example, can be combined within a very small space in such a manner that an extraordinarily great efficiency is obtained.

In the accompanying drawings the invention is shown by way of example in a section through the axis of a four-cylinder pump.

Two cylinders $a$ and $b$ are arranged parallel with one another and at the same height; two other cylinders $c$ and $d$ are placed tandem with the two first cylinders, that is to say that the two cylinders $a$ and $c$ and $b$ and $d$ are respectively placed the one in the prolongation of the other separated from the same by a distance equal to the length of the cylinder. There are only two piston rods $e$ and $f$ of which each supports at its middle an axle $g$ serving as pivot for a revolving roller $h$ which is guided in a helicoidal groove $i$ provided in the outer surface of a cylindrical cam $j$. This cam $j$ is keyed upon shaft $k$, which is disposed parallel with the cylinders and along the axis of the figure in such a manner that the cam $j$ forms the center of the apparatus.

When shaft $k$ is revolved in one or the other direction, for example through the action of crank handle $l$, the guide groove $i$ will take along the roller $h$, the oscillating motion of which will be communicated to the four pistons through the piston rods $e$ and $h$. There is no reason to prevent the arrangement of as many times four cylinders around shaft $k$ as required, the rollers $h$ of all the cylinders being guided in the same groove $i$. If, for example, the cylinders $a$, $b$ etc. would be angularly removed for a distance equal to 36°, the apparatus would comprise in all twenty cylinders situated on the generating lines of a cylinder having shaft $k$ for its axis.

To secure all parts in position it is sufficient to connect in any suitable manner the two disks $m$ and $n$ between which cam $j$ is mounted. These disks further serve as bearings for balls $o$ which serve for facilitating the rotation of shaft $k$ and for supporting the longitudinal efforts of the cam. Shaft $k$ being movable with regard to its cotter $p$, the four sets of balls $o$ can be adjusted through one regulating screw $q$. This device combined with the mounting of the cylinders in pairs and tandem affords a secure guidance for rods $e$, $f$ which is an indispensable condition for the good working of the apparatus. The stability of shaft $k$, which is secured through the adjustable ball bearings $o$ is further very essential.

The apparatus shown is an air-pump; the cylinders suck at the side near the cam $j$ and force or exhaust towards the extremities of the apparatus. These extremities may be connected by any suitable means with an air-collector. The drawing shows a device of very simple construction serving for this connection; the bottom of each cylinder $a$, $b$, $c$, $d$ etc. consists of a stopper $r$ having a non-return valve and externally screw-threaded which arrangement permits to screw each cylinder upon a base plate $s$ and $t$. These plates are composed of two parts which are soldered or riveted the one upon the other in such a manner that between the same a circular channel $u$ is provided which passes below all the valves $r$ which communicate with said channel; a tube $v$ serves for connecting said channel $u$ of plate $s$ with the channel $u$ of plate $t$ and a pipe $w$ permits to bring the apparatus into communication with the reservoir for air under pressure.

The rigidity of the several parts and of their combination is secured through a suitable number of screw-threaded connecting rods $x$ which maintain the plates and disks $s$, $m$, $n$, $t$ through nuts $y$; of course there could be used any other suitable means and devices for this purpose. On the other hand all the cylinders of the same series ($a$, $b$ etc.) could be made in one piece with a bottom-plate which then could be screwed upon the disks $m$ and $n$. Finally each cylinder could be provided with a second suction valve.

What I claim as my invention and desire to secure by Letters Patent is:—

The combination in an air-pump of a plurality of pairs of oppositely placed cylinders, pistons and rods for the cylinders, a central operating shaft around which the cylinders are arranged symmetrically, an actuating cam on the shaft, common base plates for the cylinders at each end of the pump, said base plates having ports and channels adapted for conducting the discharge of all the cylinders to a common outlet, rods connecting the base plates at opposite ends adjustably and holding the cylinder, piston rods and cams in operative relation, a pipe connecting the air channels in the base plates, ball bearings for the shaft, said shaft projecting through a base plate and having operating means attached to the projecting end of the shaft, substantially as described.

In witness whereof I have hereunto put my hand in the presence of two subscribing witnesses.

OCTAVE VADAM.

Witnesses:
    ALFRED FREY,
    FERDINAND NUSCH.